May 12, 1953 G. E. HANNER 2,638,047
HANDLE MECHANISM
Filed Dec. 13, 1948

INVENTOR.
GEORGE E. HANNER
BY Woodling and Krost
attys

Patented May 12, 1953

2,638,047

UNITED STATES PATENT OFFICE 2,638,047

HANDLE MECHANISM

George E. Hanner, Mansfield, Ohio, assignor to Dominion Electric Corporation, a corporation of Ohio Application December 13, 1948, Serial No. 64,998

4 Claims. (Cl. 99—340)

1

My invention relates to a handle mechanism for a cooking device having hingedly connected cooperating heat plates wherein the handle serves both as a handle and as a support for one of the heat plates.

An object of my invention is to provide a handle mechanism for a heat plate in which the handle is pivotally mounted on a support bracket and arrangeable in a first position engaging the heat plate and in a second position at an angle to the heat plate.

Another object of my invention is to provide a handle mechanism for a cooking device which pleasingly conforms to the exterior design of the cooking device and which is economical to manufacture.

A further object of my invention is to provide a handle mechanism for a cooking device which serves as a handle when arranged in one position and as a support when arranged in another position.

Other objects and a fuller understanding of my invention may be had by referring to the following description and claims, taken in conjunction with the accompanying drawings, in which:

Figure 1:
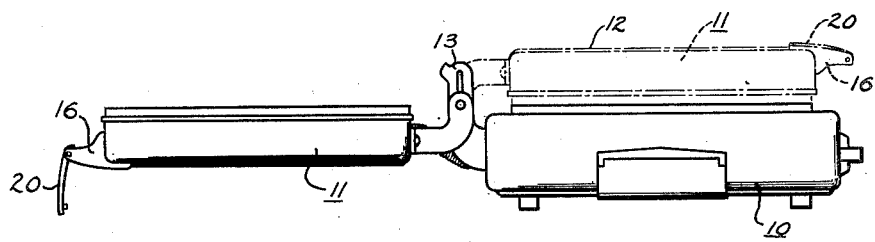
Figure 1 is a side elevational view of a cooking device having two heat plates in the fully open position.
Figure 2:
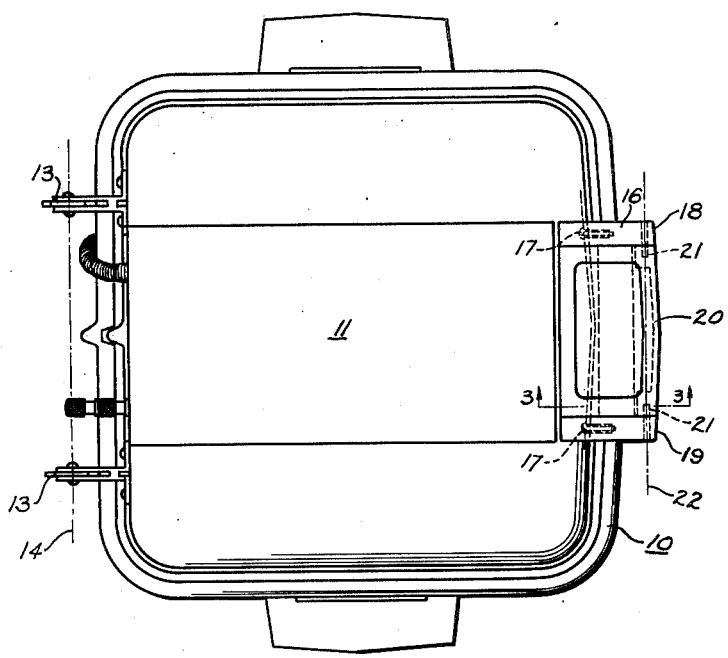
Figure 2 is a top view of the cooking device of Figure 1.

The cooking device of Figures 1 and 2 and on which my handle mechanism is applied generally comprises a lower heat plate 10 and an upper heat plate 11 hingedly connected together. The term heat plate is used in its broad sense and when referring to a waffle iron, sandwich toaster, or other cooking devices includes the heating elements, grills, shells, and other component parts. In Figure 1, I illustrate the upper heat plate 11 as being in the fully open position relative to and in the plane of the lower heat plate 10 whereby both heat plates may be used simultaneously for open cooking of foods. The phantom lines 12 of Figure 1 illustrate the position of the upper heat plate 11 in its closed position relative to the lower heat plate 10, and cooperating therewith for cooking foods therebetween. Hinges 13 connect the plates together and provide for hinged movement of the upper

2 heat plate 11 between the said closed position and the open position. The upper heat plate 11 is hingedly moveable about a hinged axis 14 extending between the hinges 13.

I have provided a handle support bracket 16 for the upper heat plate 11. This handle support bracket 16 is designed to conform with the outward appearance of the cooking device and is secured to the upper heat plate 11 with screws 17 or any other suitable means. The handle support bracket 16 is described as having spaced end or arm portions 18 and 19 which extend outwardly from the heat plate and define aligned support portions. The aligned support portions are referred to in the drawings with the same reference character as the respective end or arm portions 18 and 19 and are disposed at a distance from the upper heat plate 11.

Figure 4:
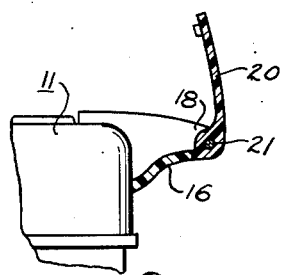
Figure 4 is the sectional view of Figure 3, but showing the handle in its supporting position and at an angle to the heat plate.
Figure 3:
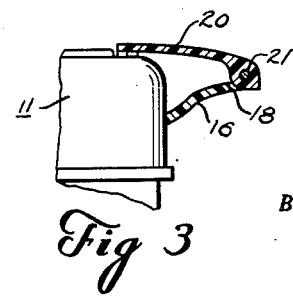
Figure 3 is a sectional view along the lines 3—3 of Figure 2 and showing the handle engaging the cooking plate.

I have further provided my handle mechanism with a handle member 20 pivotally mounted on these spaced support portions 18 and 19 by pivot pins 21. The handle member 20 is illustrated in my drawings as extending between these spaced end or support portions 18 and 19 (see Fig. 2) and as engaging the surface of the upper heat plate 11 when arranged in one of its positions (see Fig. 3). When the upper heat plate 11 is hingedly opened to its fully open position relative to the lower heat plate 10, as is illustrated in Figure 1, the handle member 20 may be arranged to serve as a support for the upper heat plate 11. When the handle member 20 is arranged in the position where it can serve as a support it is disposed at an angle to the plane of the upper heat plate 11. In Figure 4 I illustrate the handle member 20 as being disposed at an angle of substantially 90° to the plane of the upper heat plate 11.

The handle member 20, supported between the spaced end portions 18 and 19 of the handle support bracket 16 by the pivot pins 21, is pivotally moveable relative to the upper heat plate 11 and about a pivot axis 22, which extends substantially parallel to the hinge axis 14. The upper heat plate 11 is disposed between pivot axis 22 and the hinge axis 14. The handle member 20 extends from its pivot axis 22 towards the hinge axis 14 to engage the upper heat plate 11. When a person wishes to move the upper heat plate 11 from its closed position, as is illustrated by the phantom lines 12 of Figure 1, to its open position, as is illustrated by the solid lines of Figure 1, he pivotally arranges the handle member 20 in its support position while hingedly moving the upper heat plate 11. The handle member 20 is automatically arranged in its support position by the fingers of the operator as he fully opens the heating device. The handle support member 20 cooperates with the lower heat plate 10 to support the upper heat plate 11 in the plane of the lower heat plate 10 whereby both heat plates may be used simultaneously for cooking.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a cooking device having upper and lower hingedly connected cooperating cooking units hingedly movable about a hinged axis from a closed position to an open position, said upper cooking unit having a vertically extending side surface and laterally extending top surface, a handle mechanism comprising a handle support bracket secured to said upper cooking unit, said handle support bracket comprising two spaced side members each having a first portion extending laterally away from said vertically extending side surface and a second portion overlapping said top surface, a handle member disposed between said two side members and substantially bridging the space therebetween, said handle member having a pivot end portion and a free end portion, pivot means for pivotally mounting said pivot end portion of the handle member to said side members with the pivot axis disposed at a distance from said vertically extending side surface and extending substantially parallel to said hinged axis, said free end portion overlapping said top surface and being swingably movable toward and away from said top surface.

2. In a cooking device having upper and lower hingedly connected cooperating cooking units hingedly movable about a hinged axis from a closed position to an open position, said upper cooking unit having a vertically extending side surface and a laterally extending top surface, a handle mechanism comprising a handle support bracket secured to said upper cooking unit, said handle support bracket comprising support means extending laterally away from said vertically extending side surface, a handle member having a pivot end portion and a free end portion, pivot means for pivotally mounting said pivot end portion of the handle member to said support means with the pivot axis disposed at a distance from said vertically extending side surface and extending substantially parallel to said hinged axis, said free end portion overlapping said top surface and being swingably movable toward and away from said top surface.

3. In a cooking device having upper and lower hingedly connected cooperating cooking units hingedly movable about a hinged axis from a closed position to an open position, said upper cooking unit having a vertically extending side surface and a laterally extending top surface, a handle mechanism comprising a handle support bracket secured to said cooking device and laterally extending from said vertically extending side, said support bracket having in its upper side a recess with vertically extending opposing sides, a handle member disposed in said recess and substantially bridging the space between said opposing sides, said handle member having a pivot end portion and a free end portion, pivot means for pivotally mounting said pivot end portion of the handle member to said support bracket with the pivot axis disposed at a distance from said vertically extending side surface and extending substantially parallel to said hinged axis, said free end portion overlapping said recess and said top surface and being swingably movable in a downward direction toward said top surface and in an upward direction away from said top surface.

4. In an electric cooking appliance of a type including a base having a horizontally disposed cooking surface, a cover having a cooperating cooking surface, and a pivotal connection between said base and cover, said cover being movable from a closed position in which said cooking surfaces are in opposed relation to an open position in which said cooking surfaces face upwardly in coplanar relation, an improved handle of heat insulating material for moving said cover comprising a handle body member, means securing said body member to the cover at an edge thereof opposite its pivotal connection to the base, said body member extending outwardly from the cover in a plane substantially parallel to the cover cooking surface, a handle support member cooperable with said body member, a hinged connection between said members for relative rotational movement on a horizontal axis adjacent the outer edge of said body member, said support member being movable from a retracted position in which said members form a unitary handle to an extended position in which said support member extends outwardly from said body member in a direction to support said cover in its wholly open position, means limiting pivotal movement of said support member beyond said extended position.

GEORGE E. HANNER.

References Cited in the file of this patent

UNITED STATES PATENTS

| Number | Name | Date |
|---|---|---|
| 1,873,104 | Benson | Aug. 23, 1932 |
| 2,009,792 | Uhl | July 30, 1935 |
| 2,041,327 | Fischer | May 19, 1936 |
| 2,314,872 | Dickey | Mar. 30, 1943 |